United States Patent [19]
Elko et al.

[11] Patent Number: 5,574,945
[45] Date of Patent: Nov. 12, 1996

[54] MULTI CHANNEL INTER-PROCESSOR COUPLING FACILITY PROCESSING RECEIVED COMMANDS STORED IN MEMORY ABSENT STATUS ERROR OF CHANNELS

[75] Inventors: David A. Elko, Poughkeepsie, N.Y.; Gottfried A. Goldrian, Boeblingen, Germany; Steven N. Goss, Lake Katrine, N.Y.; Thomas A. Gregg, Highland, N.Y.; Audrey A. Helffrich, Poughkeepsie, N.Y.; Ambrose A. Verdibello, Jr., Millbrook, N.Y.

[73] Assignee: International Business Machines Corporation, Armonk, N.Y.

[21] Appl. No.: 477,926

[22] Filed: Jun. 7, 1995

Related U.S. Application Data

[63] Continuation of Ser. No. 147,703, Nov. 4, 1993, abandoned.

[51] Int. Cl.[6] ................................. G06F 15/163
[52] U.S. Cl. ............... 395/825; 395/183.19; 395/185.02; 395/200.08; 395/866; 395/309
[58] Field of Search ......................... 395/183.19, 185.02, 395/200.18, 825, 866, 309

[56] References Cited

U.S. PATENT DOCUMENTS

| | | | |
|---|---|---|---|
| 4,887,076 | 12/1989 | Kent et al. | 340/825.16 |
| 5,138,611 | 8/1992 | Carn et al. | 370/60 |
| 5,204,949 | 4/1993 | Yasue et al. | 395/200.2 |
| 5,206,936 | 4/1993 | Holland et al. | 395/309 |
| 5,255,372 | 10/1993 | Butter et al. | 395/309 |

*Primary Examiner*—Ken S. Kim
*Attorney, Agent, or Firm*—Lynn L. Augspurger; Blanche E. Schiller

[57] ABSTRACT

A computer system with a coupling facility is provided with a plurality of processors and a plurality of intersystem channels coupled to the processors via a memory bus. The coupling facility includes a memory bus interface for the memory bus and a plurality of channels for coupling said channels to said processors. The memory bus interface includes an adapter with at least two hardware vectors provided for command detection, command isolation, and parallel testing of the error states of the intersystem channels, one which detects a command vector arrival, and a second which contains error state vector indicators. A LOCATE CHANNEL BUFFER (LCB) instruction is employed which performs a sense and reset operation on the command vector to identify and isolate a new command, and subsequently reads a vector of said error states vector indicator to determine the presence or absence of link errors.

19 Claims, 18 Drawing Sheets

FIG.16A

```
1
2    INPUT: Address of link IO Block
3
4                                                              ← 1602
5       Get Link Facility lock;
6       For all channel buffers in round robin fashion
7       {IF channel buffer is status pending              ⎫
8       {Call subroutine to handle status pending;        ⎬ 1604
9       }                                                 ⎭
10      IF channel buffer Retry Request indicates retry MRB ⎫
11      {Redrive last MRB;                                  ⎬ 1606
12      }                                                   ⎭
13      IF channel buffer is command active
14      {FOR all chpids that are dispatched               ⎫
15      {if software flag indicates this chpid ESP        ⎬ 1608
16      {return NO MSG FOUND;                             ⎭
17      }
```

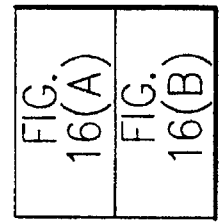

FIG. 16

```
18  Test hardware ESP with TMPS xx;                    ⎫
19  IF Condition Code indicates Error State Pending    ⎬ 1610
20  {Set software flag to indicate ESP for this chpid; ⎪
21   Clear hardware ESP with CMPS xx;                  ⎪
22   return NO MSG FOUND;                              ⎭
23  }
24
25  Set Channel buffer dispatched flag for this channel buffer; ⎫
26  Mark this processor busy with this chpid;                   ⎬ 1612
27  Release Link Facility lock;                                 ⎭
28  Fill in link io block with appropriate stuff;   ⎫ 1614
29  return MSG FOUND active/inactive path;          ⎭
30
31  return NO MSG FOUND;  ← 1616
32
```

```
1
2   INPUT: Address of link IO Block
3
4  ⎧
5  ⎨   Get Link Facility lock;
6  ⎩
7       Select Channel buffer in round robin fashion and  ⎫
8       get Status pending and Retry Request indicators   ⎬ 1702
9       from Channel buffer;                              ⎭
10
11      IF next Channel buffer is status pending          ⎫
12         {Handle status pending;                        ⎪
13         ⎣~⎦                                            ⎪
14                                                        ⎬ 1704
15      ELSE IF next channel buffer retry request indicates retry MRB
16         {Redrive last MRB;                             ⎪
17         ⎣~⎦                                            ⎭
18
19      Release Link Facility lock;
20
21      Call subroutine to issue LCB;  ← 1706
22
```

FIG.17B

```
23  IF Condition Code indicates control program token returned
24   }IF cptoken is zero                                          ⎫
25      {return NO MSG FOUND;                                     ⎬ 1708
26   ELSE                                                         ⎭
27   {Get Link Facility lock;
28    IF Channel buffer indicated by cptoken is status pending or
29       not command active                                       ⎫
30       }IF status pending                                       ⎪
31         {Handle status pending;                                ⎪
32                                                                ⎪
33       Clear channel buffer dispatched flag on this channel buffer;  ⎬ 1710
34       Clear this processor working on chpid associated with this    ⎪
35          channel buffer flag;                                  ⎪
36       Release Link Facility lock;                              ⎪
37       return NO MSG FOUND;                                     ⎭
38
39
40    Release Link Facility lock;                                 ⎫
41    Update link io block with proper contents for msg found;    ⎪
42    IF msg came' in on active path                              ⎬ 1712
43       {return MSG FOUND ACTIVE PATH;                           ⎭
44
```

```
45      ELSE
46         {return MSG FOUND INACTIVE PATH;
47          ~~
48          ~~                                    } 1714
49   ELSE
50      {Call subroutine to handle ESP condition;    /*Condition Code indicate Error State */ } 1716
51
```

FIG.18

```
1   INPUT: Address of cptoken
2
3
4  ⎬
5   Issue LCB instruction;
6
7   IF Condition Code indicates control program token returned  ⎫
8   {Copy control program token returned by LCB into callers token;  ⎬ 1802
9                                                                    ⎭
10  IF control program token not zero                          ⎫
11  {Get Link Facility lock;                                   ⎪
12                                                             ⎪
13  Set Channel Buffer dispatched for this channel buffer flag;⎬ 1804
14                                                             ⎪
15  Indicate this processor is working on chpid associated with⎪
16  this channel buffer;                                       ⎪
17                                                             ⎪
18  Release Link Facility lock;                                ⎭
19
20  ⎬
21
22  Copy control program token returned by LCB into callers token;  ⎫
23                                                                  ⎬ 1806
24  return Condition Code from LCB instruction;                     ⎭
25
```

```
1  Get Link Facility lock;
2
3  FOR all chpids
4  {TMPS chpid;
5
6   IF condition code indicates error state pending          ⎫
7   {IF channel buffers for this chpid are dispatched        ⎪
8     {Set indicator for this chpid that ESP is set;         ⎬ 1902
9    ELSE                                                    ⎪
10    {CMPS chpid to clear hardware ESP indicator;           ⎭
11   }
12  }
13
14 Release Link Facility lock;
```

FIG.19

MULTI CHANNEL INTER-PROCESSOR COUPLING FACILITY PROCESSING RECEIVED COMMANDS STORED IN MEMORY ABSENT STATUS ERROR OF CHANNELS

This application is a continuation of application Ser. No. 08/147,703, filed Nov. 4, 1993 now abandoned.

FIELD OF THE INVENTION

This invention relates to a computer system having plural processors and intersystem channels coupled to the processors, and particularly to a coupling facility message-dispatching mechanism for messages received at the coupling facility, and a memory bus interface providing command detection, command isolation, and parallel testing of error states of said intersystem channels.

CROSS REFERENCE TO RELATED APPLICATIONS

Cross Reference to Related Applications

This application contains subject matter which is related to the following U.S. patent applications, and while of more general applicability is an improvement which can be used in connection with these related inventions. Many of these referenced applications have been published in corresponding European and or Japanese applications as of the filing date of this application, but the numbers thereof have not been identified as of the filing of this application. They are:

"Configurable, Recoverable Parallel Bus" by N.G. Bartow et al, Ser. No. 07/839,657, filed Feb. 20, 1992 now issued U.S. Pat. No. 5,357,608;

"High Performance Intersystem Communications For Data Processing Systems" by N.G. Bartow et al, Ser. No. 07/839,652, filed Feb. 20, 1992 now issued U.S. Pat No. 5,421,803;

"Frame-Group Transmission And Reception For Parallel/Serial Buses", by N. G. Bartlow, et al Ser. No. 07/839,986 filed Feb. 20, 1992 now issued U.S. Pat. No. 5,267,240;

"Method and Apparatus for Distributed Locking of Shared Data, Employing a Central Coupling Facility" by D. A. Elko et al, Ser. No. 07/860,808, filed Mar. 30, 1992 now issued U.S. Pat. No. 5,339,427;

"Communicating Messages Between Processors And A Coupling Facility" by D. A. Elko et al, Ser. No. 07/860,380, filed Mar. 30, 1992 now abandoned.

"Sysplex Shared Data Coherency Method and Means" by D. A. Elko et al, Ser. No. 07/860,805, filed Mar. 30, 1992;

"Command Quiesce Function" by D. A. Elko et al, Ser. No. 07/860,330, filed Mar. 30, 1992 now issued U.S. Pat. No. 5,339,405;

"Storage Management For a Shared Electronic Storage Cache" by D.A. Elko et al, Ser. No. 07/860,807, filed Mar. 30, 1992 now issued U.S. Pat. No. 5,457,793;

"Management Of Data Movement From A SES Cache To DASD" by D.A. Elko et al, Ser. No. 07/860,806, filed Mar. 30, 1992 now issued U.S. Pat. No. 5,493,668;

"Command Retry System" by D. A. Elko et al, Ser. No. 07/860,378, filed Mar. 30, 1992 now issued U.S. Pat. No. 5,392,397;

"Integrity Of Data Objects Used To Maintain State Information For Shared Data At A Local Complex" by D. A. Elko et al, Ser. No. 07/860,800, filed Mar. 30, 1992 now issued U.S. Pat. No. 5,331,673;

"Management Of Data Objects Used To Maintain State Information For Shared Data At A Local Complex" by J. A. Frey et al, Ser. No. 07/860,797, filed Mar. 30, 1992 now issued U.S. Pat. No. 5,388,266;

"Recovery Of Data Objects Used To Maintain State Information For Shared Data At A Local Complex" by J. A. Frey et al, Ser. No. 07/860,647, filed Mar. 30, 1992 now issued U.S. Pat. No. 5,394,542;

"Message Path Mechanism For Managing Connections Between Processors And A Coupling Facility" by D. A. Elko et al, Ser. No. 071860,846, filed Mar. 30, 1992 now issued U.S. Pat. No. 5,181,854;

"Method And Apparatus For Notification Of State Transitions For Shared Lists of Data Entries" by J. A. Frey, et al., Ser. No. 07/860,809, filed Mar. 30, 1992 now issued U.S. Pat. No. 5,390,328;

"Method And Apparatus For Performing Conditional Operations on Externally Shared Data" by J. A. Frey, et al., Ser. No. 07/860,655, filed Mar. 30, 1992 now abandoned;

"Apparatus And Method For List Management In A Coupled DP System" by J. A. Frey, et al., Ser. No. 07/860,633, filed Mar. 30, 1992 now issued U.S. Pat. No. 5,410,695;

"Interdicting I/O And Messaging Operations In A Multi-System Complex" by D. A. Elko, et al., Ser. No. 07/860,489, filed Mar. 30, 1992 now issued U.S. Pat. No. 5,394,554;

"Method and Apparatus for Coupling Data Processing Systems" by D.A. Elko, et al., Ser. No. 07/860,803, filed Mar. 30, 1992 now issued U.S. Pat. No. 5,317,739.

The following related applications are unpublished:

"Quiesce and Unquiesce Function for Intersystem Channels", by Neil G. Bartow, et al., Ser. No. 08/071,154, filed Jun. 1, 1993 now issued U.S. Pat. No. 5,481,738;

"Configurable, Recoverable Parallel Bus", by Neil G. Bartow et al, Ser. No. 08/071,146, filed Jun. 1, 1993 now issued U.S. Pat. No. 5,509,122;

"Frame Group Transmission and Reception for Parallel/Serial Buses", by Neil G. Bartow, et al, Ser. No. 08/071,115, filed Jun. 1, 1993 now issued U.S. Pat. No. 5,455,831;

"Concurrent Maintenance of Degraded Parallel/Serial Buses", by Kenneth J. Fredericks et al, Ser. No. 08/070,587, filed Jun. 1, 1993 now issued U.S. Pat. No. 5,418,939;

"Null Words for Pacing Serial Links to Driver and Receiver Speeds", by Danniel F. Casper et al, Ser. No. 08/071,150, filed Jun. 1, 1993.

The following applications are filed concurrently herewith:

"Mechanism for Receiving Messages at a Coupling Facilty", by D. A. Elko,

"Improved Skew Measurement for Receiving Frame-Groups", by T. A. Gregg, et al Ser. No. 08/147,701, filed Nov. 4, 1993 now issued U.S. Pat. No. 5,425,020;

"Suspending, Resuming, and Interleaving Frame-Groups", by T.A. Gregg, et al Ser. No. 08/148,133, filed Nov. 4, 1993 now abandoned; and "Frame-Group Reception and Processing", by T.A. Gregg, et al, Ser. No. 08/147,702, filed Nov. 4 1993 now abandoned.

These co-pending applications and the present application are owned by one and the same assignee, International Business Machines Corporation of Armonk, N.Y.

The descriptions set forth in these co-pending applications are hereby incorporated into the present application by this reference.

REFERENCES USED IN THE DISCUSSION OF THE INVENTION

During the detailed description which follows the following works will be referenced as an aid for the reader. U.S. Pat. Nos. 5,003,558 and 5,025,458 are incorporated by reference herein for their showing of various aspects of a channel for synchronizing and decoding of serial data transmission.

BACKGROUND OF THE INVENTION

The present invention relates to a network of central processing complexes (CPCs) connected by intersystem channels to a coupling facility, each CPC having data objects used to maintain state information for shared data in the coupling facility storage, and more particularly relates to a mechanism in the coupling facility for dispatching a new message command for execution when such command dispatch is permitted by the link states.

Command dispatching consists of three main actions; first the arrival of a command is detected by the dispatcher function executing on one of the processors in the coupling facility, second the ownership of the command is obtained by this processor to isolate command execution from the dispatcher running concurrently on another processor, and lastly, the error state of each of the links attached to the coupling facility is checked to see if any errors may be present for commands in execution on another coupling facility processor. The last function is essential to the correct implementation of the command quiesce rules defined in the related application U.S. Ser. No. 07/860,330, Command Quiesce Function (D. A. Elko et al.). The error state reporting mechanism for intersystem channels is defined in the related application U.S. Ser. No. 07/860,800, Integrity of Data Objects Used to Maintain State Information for Shared Data at a Local Complex (D. A. Elko et al.), and represents prior ad to the present invention.

A dispatcher function in the coupling facility may be built on the mechanisms defined in U.S. Ser. No. 07/860,800 and the mechanisms in the related application "Mechanism For Receiving Messages at a Coupling Facility," by D.A. Elko, et al filed concurrently herewith. In particular, the arrival of a command is reported in the channel buffer by the intersystem channel and detected by the dispatcher routine when a processor is available to perform work. Internal locks isolate the command to a processor. Finally, the TEST MESSAGE PATH STATE instruction defined in U.S. Ser. No. 07/860,800, is used to perform the third dispatching function, by individually testing the error state of each link attached to the coupling facility for which a command is currently in execution. When no link errors are present dispatching of the command may continue. When a link error exists the CLEAR MESSAGE PATH STATE instruction also defined in U.S. Ser. No. 07/860, 800, is used to clear each error condition after which the dispatching program delays command execution until the commands associated with all failed links are completed or quiesced.

The main drawback of this approach is the pathlength incurred on each command for the overhead of testing each link individually for the presence of an error across a long-latency path in the hardware. The test requires a sense command to be communicated between the processor and the intersystem channel, and while generally deemed to have adequate performance when a single link is tested, may become quite costly when multiple links are involved. Also, as the number of processors available for the coupling facility grows, so does the overhead of testing for error conditions.

SUMMARY OF THE INVENTION

The shortcomings of the prior art are overcome by the addition of a special hardware interface that allows for command detection, command isolation, and parallel testing of the error states of the intersystem channels across a low-latency path in the hardware. In particular, two hardware vectors are provided in the memory interface; one which detects command arrival, and a second which contains error state indicators. Additionally, a new instruction is provided, LOCATE CHANNEL BUFFER (LCB), which performs a sense and reset operation on the command vector to identify and isolate a new command, and subsequently reads the vector of error states to determine the presence or absence of link errors. When link errors are present, LCB restores the command active indicator and returns an error condition code to the Coupling Facility Control Program. In the more likely event that no errors are present, LCB returns the identity of the isolated command to the coupling facility which can complete the dispatch operation.

It is a primary objective of the present invention to provide an efficient mechanism for identifying and isolating newly arrived commands and simultaneously detecting the absence of link errors.

It is another objective of the present invention to provide a round-robin scheme for detecting command arrival to prevent biasing of service to particular intersystem channels.

It is another objective of the present invention to allow for efficient lookup procedures by the dispatcher program by storing a token when the channel buffer is prepared and returning the token when a command arrival is reported.

It is another objective of the present invention to allow for quick access to stored information in the microcode storage by providing read-only areas and processor-specific fields for LCB functioning.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings which:

FIGS. 16, 16A and 16B describe the logic of the coupling facility control program (CFCP) dispatcher when the LCB instruction is not utilized.

FIGS. 17, 17A, 17B and 17C describe the changed logic for the CFCP dispatcher when the LCB instruction is utilized.

FIG. 18. continues the description of the CFCP dispatcher in the previous figure by showing the logic for issuing the LCB instruction.

FIG. 19. continues the description of the CFCP dispatcher in the previous two figures when error conditions exist in a channel.

DESCRIPTION OF THE PREFERRED EMBODIMENT

Figure 1:
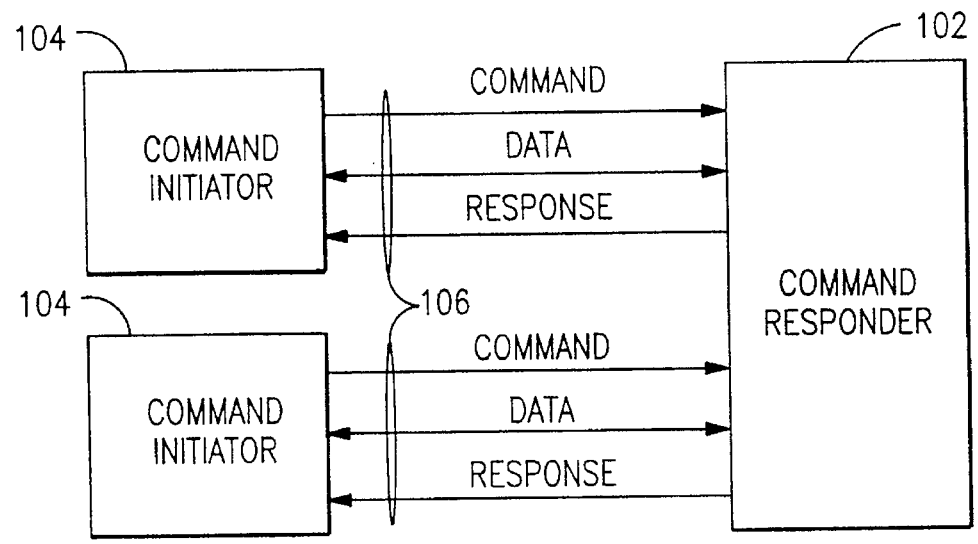
FIG. 1. is a block diagram for describing a general environment for practicing the present invention.

The block diagram of FIG. 1 depicts a generalized environment which can implement the present invention to advantage. It is comprised of a command responder 102 that responds to commands received from one or more command initiators 104 over one or more links 106. The actual configuration of a link 106 can take a number of forms. The link 106 could be a large parallel bus or a fiber optic pair that transmit in serial fashion or a bundled number of such links. In any case, the command responder 102 will receive a command to be executed at the request of a command initiator 104, with or without data, and provide a response back, with or without data. There can be a single command initiator 104 that transmits a plurality of commands in sequence, or more than one initiator 104 as shown.

Figure 2:
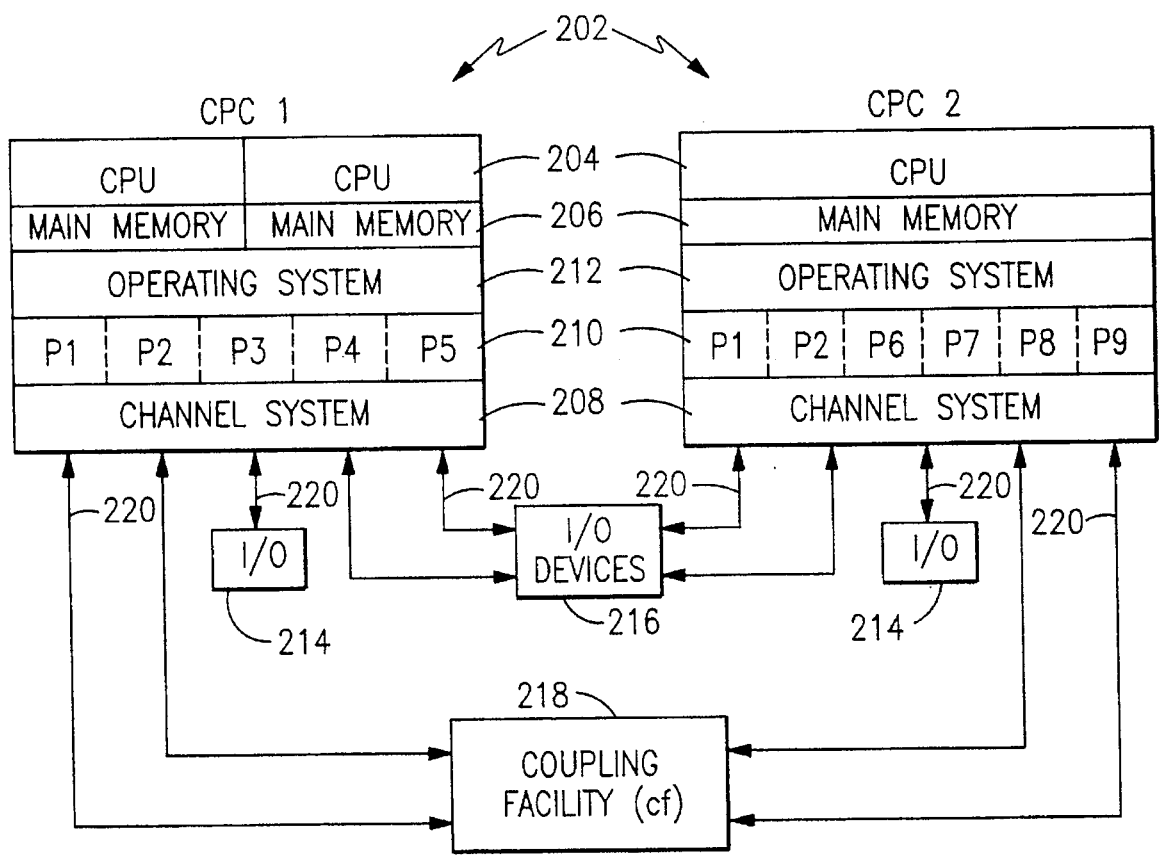
FIG. 2. is a block diagram of a data processing system complex that incorporates the present invention to provide shared usage of system-wide data and control structures.

The block diagram of FIG. 2 provides more detail of a preferred environment for practicing the present invention. It depicts the coupling together of at least two autonomous data processing systems into a system complex (Sysplex) that exhibits a single system image to a user. Autonomous data processing systems 202 are designated as Central Processing Complex (CPC) 1 and 2. CPC 1 and 2 can each be an International Business Machines ES/9000 data processing system.

An ES/9000 data processing system 202 is comprised of one or more Central Processing Units (CPU) 204, a main memory 206 and a channel system 208. Main memory 206 stores data which is manipulated by a plurality of stored application or utility programs 210 (P1–P9), all under the control of an operating system 212 such as the IBM MVS/SP control program. In a Sysplex environment, where fault tolerance and/or increased performance is desired, some of the programs 210 such as P1 and P2 may be duplicated in the systems 202.

The channel system 208 is comprised of a plurality of channels which connect each system 202 with various peripheral units. Certain of the peripheral units may be various I/O units 214 such as magnetic tapes, printers, direct access storage devices (DASD), or communication control units to provide connection of user terminals for example. Some I/O devices 216 may be shared by the two systems 202. The channel systems 208 are also shown in FIG. 2 to be connected to a Coupling Facility 218 (cf) to be more fully described as pad of the preferred embodiment of the present invention.

Comparing FIG. 2 with the previous discussion of FIG. 1, the command responder 102 would be cf 218 or the shared I/O devices 216. The links 106 of FIG. 1 are the paths 220 of FIG. 2. In FIG. 2, a command initiator 104 of FIG. 1 could be viewed as being a system 202, program 210, or a channel within the channel system 208.

Figure 3:
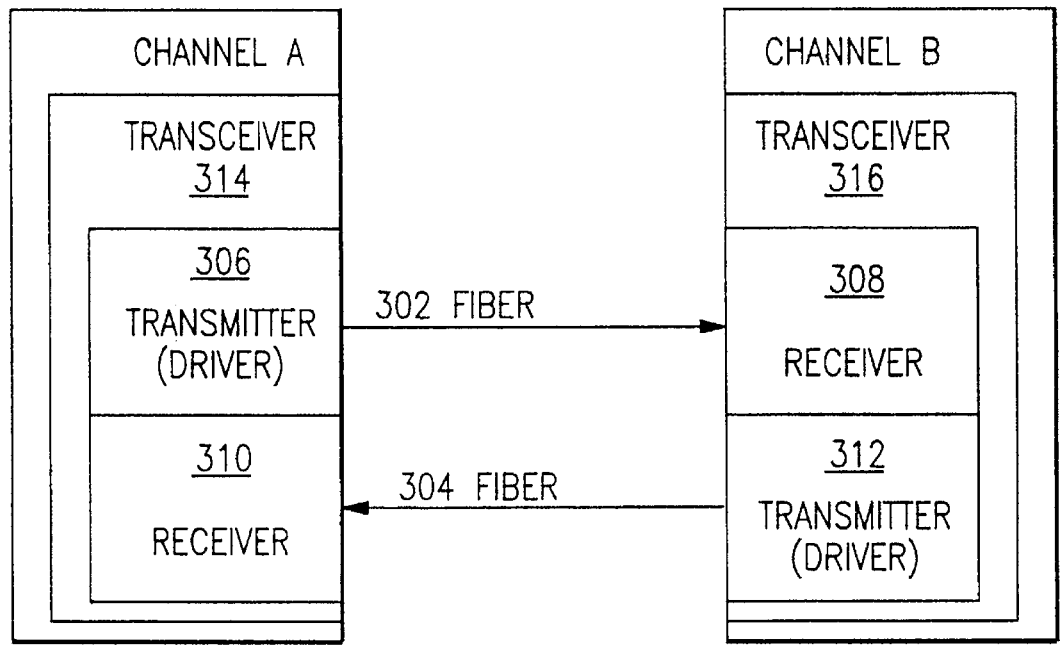
FIG. 3. depicts the connections between two channels of the system.

FIG. 3 depicts more detail of the physical attachment when the command initiator 104 is a channel within the channel system 208. Each of the physical links attached to a channel can contain a single conductor or be constructed from a number of conductors. In the present invention the conductors of the link are preferably fiber optic cable pairs that provide serial, bidirectional transfer of information between the units. Commonly assigned U.S. Pat. Nos. 5,003,558 and 5,025,458 are incorporated by reference herein for their showing of various aspects of a channel for synchronizing and decoding of serial data transmission between the systems 202 and, for example cf 218.

In FIG. 3, Channels A and B are shown as being connected by a single conductor, fiber-pair 302 and 304. The designation of A and B for the two channels depicted in this figure is solely for explanatory purposes. Although there are two fibers, 302 and 304, this fiber-pair can be considered a single conductor because both fibers are required for bidirectional communication. Each fiber in the system interconnects a driver at one end and a receiver at the other end of the link. For example, fiber 302 connects transmitter 306 in Channel A with receiver 308 in Channel B (conversely fiber 304 connects driver 312 in Channel B with receiver 310 in Channel A). A driver and receiver are paired in a channel in a device called a transceiver. In FIG. 3, transmitter 306 and receiver 310 form one transceiver, 314, while transmitter 312 and receiver 308 constitute a separate transceiver, 316, in Channel B. These interconnected transceivers allow for data to flow in one direction on one fiber (e.g. from Channel A to Channel B on fiber 302) and in the opposite direction on the other fiber (e.g. from Channel B to Channel A on fiber 304).

DESCRIPTION OF THE COUPLING FACILITY

Figure 4:
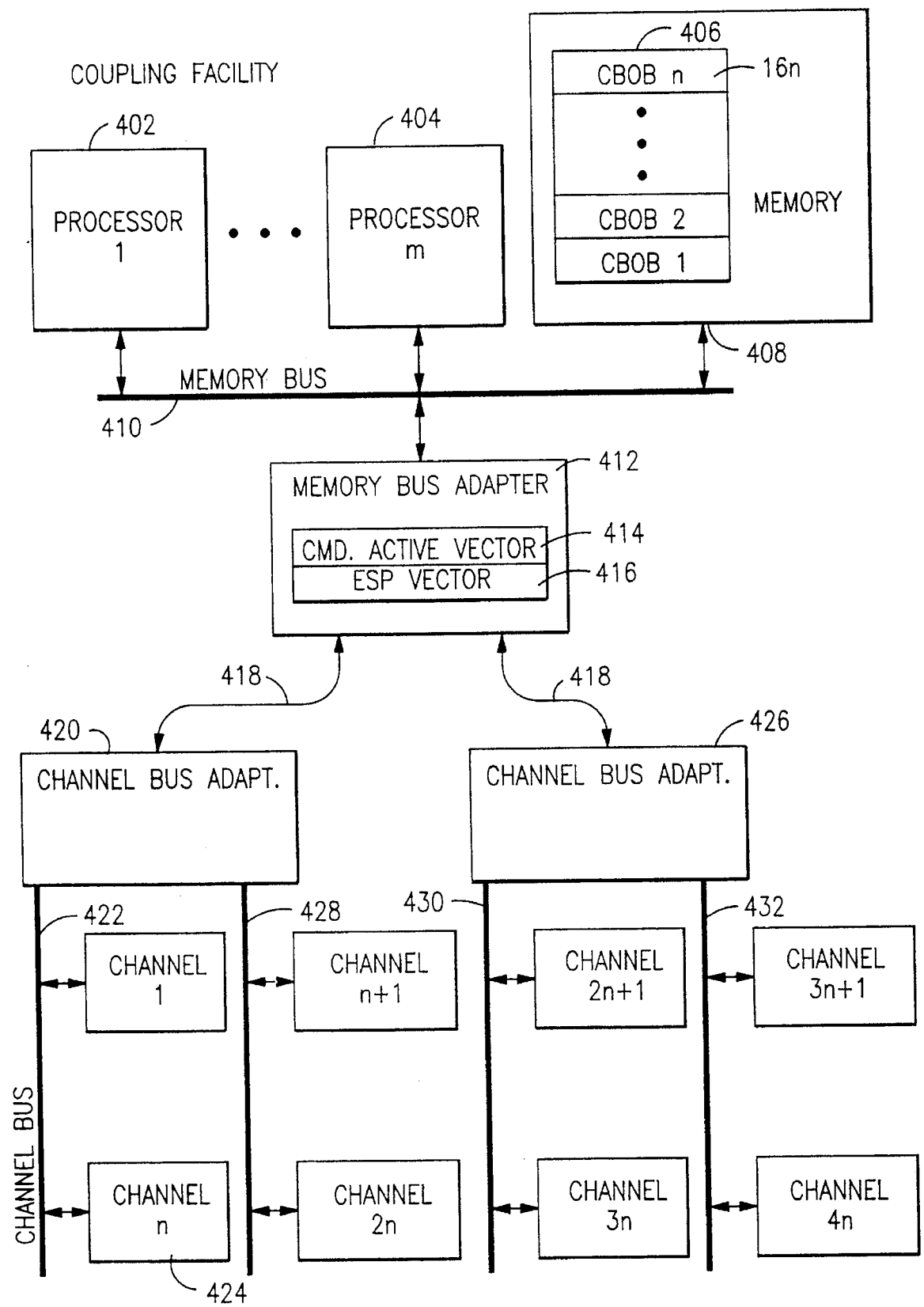
FIG. 4. is a block diagram of a coupling facility.

FIG. 4 is a block diagram of the hardware components of the coupling facility. A number of processors 402 to 404 are directly connected to intersystem channels by a memory interface including a common memory 408, a Memory Bus Adapter 412 (MBA), and a memory bus 410. The interface also includes a memory bus adapter 412 which contains two hardware vector elements, the command active vector 414 and the error state pending (ESP) vector 416. The adapter uses cables 418 as an interface to the external Channel Bus Adapter 420 (CBA). A number of intersystem channels (also simply channels) 424 may be connected to the channel bus 422 which is controlled by the Channel Bus Adapter 420. In this example of a typical coupling facility, two CBAs 420 and 426 are shown which support two channel buses each 422,428,430 and 432. Since each channel supports 2 primary channel buffers and 2 secondary channel buffers, a total of 4n channels are connected. Thereby a total of 8n primary and 8n secondary Channel Buffer Operation Blocks 406 (CBOB) are required. These CBOBs are in a protected area of the memory 408.

Figure 5:
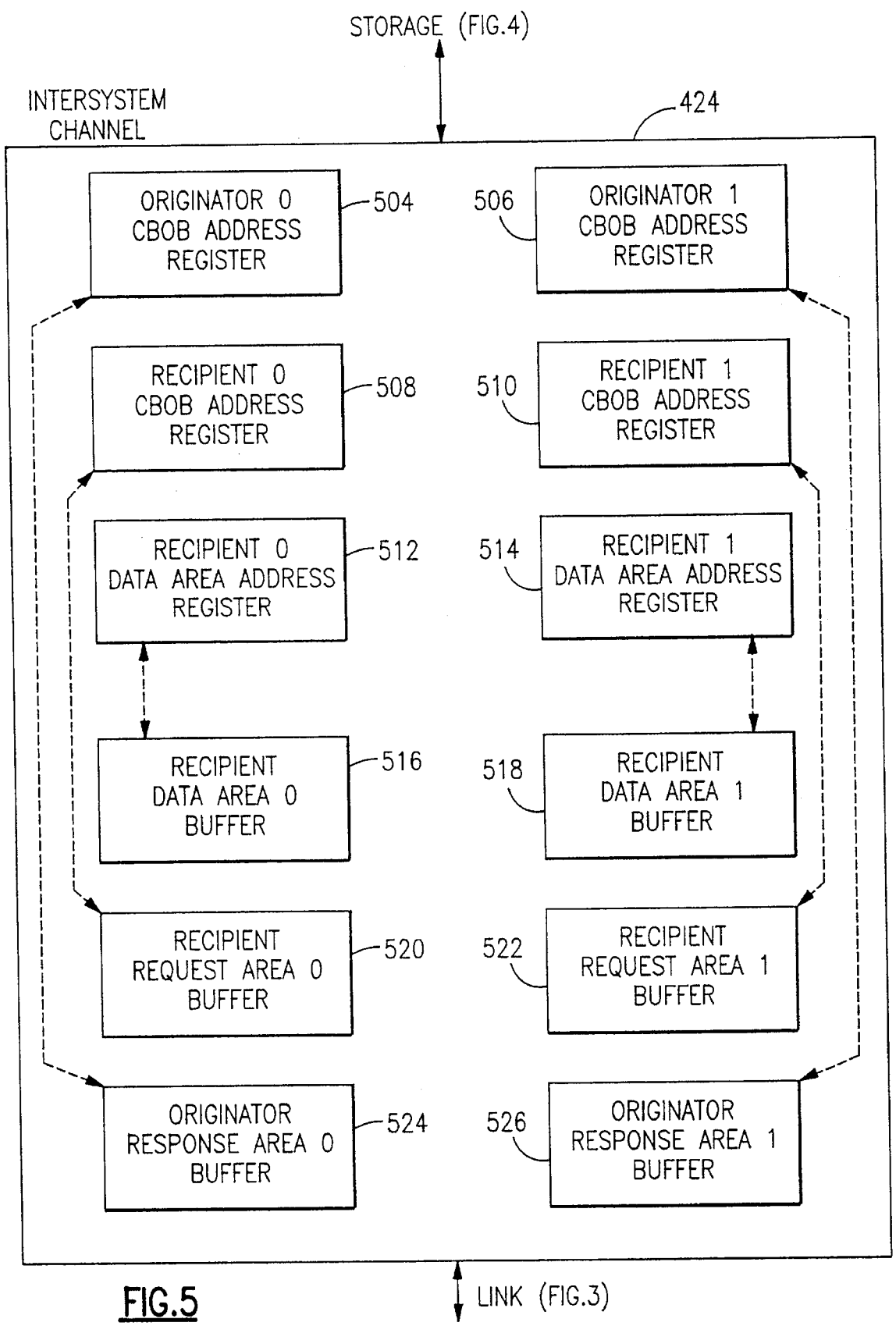
FIG. 5. depicts the elements of an intersystem channel.

FIG. 5 is a block diagram of the receive buffers in the intersystem channel 424 and the main processor storage address registers used to send and receive frames. The channel has four buffer sets, two originator buffer sets numbered 0 and 1 and two recipient buffer sets also numbered 0 and 1. Each of the two originator buffer sets has one receive buffer. Originator buffer set 0 has Originator Response Area 0 buffer 524, and Originator buffer set 1 has Originator Response Area 1 buffer 526. Each of the two originator buffer sets also has a Channel Buffer Operation Block (CBOB) base address register. Originator buffer set 0 has the Originator 0 CBOB Base Address register 504, and originator buffer set I has the Originator 1 CBOB Base Address register 506. The contents of the CBOB are described later.

Each of the two recipient buffer sets has two receive buffers, one for requests and one for data areas. Recipient buffer set 0 has Recipient Request Area 0 buffer 520 and Recipient Data Area 0 buffer 516, and recipient buffer set 1 has Recipient Request Area 1 buffer 522 and Recipient Data Area 1 buffer 518. Each of the two recipient buffer sets has a CBOB base address register and an address register to control the data area. Recipient buffer set 0 has the Recipient 0 CBOB Base Address register 508, and recipient buffer set 1 has the Recipient 1 CBOB Base Address register 510. Also, recipient buffer set 0 has Recipient Data Area 0 Address register 512, and recipient buffer set 1 has Recipient Data Area 1 Address register 514.

Two bits in the command active vector are associated with each channel, one for each primary buffer, and one bit in the ESP vector is associated with each channel. The bits are set by hardware controls in the channel 424 and the Channel Bus Adapter 420 and are reset by sense commands issued by the processors 402–404. The arrival of a new command in a recipient request area buffer 520 or 522, causes the corresponding bit in tile command active vector 414 to be set by the hardware controls. Similarly, any error condition detected by a channel causes the corresponding bit in the ESP vector 416 to be set by the hardware controls.

The propagation of the error state from the channel to the command active vector in the MBA allows for a significant improvement in the time required by a processor to sense a channel error. Prior art required a sense command to be sent through a high latency path consisting of the MBA 412, the cable 418, the CBA 420, the channel bus 422 and the channel 424, with a corresponding return path. The present invention allows the sense to read the error state directly in the MBA 412.

Figure 6:
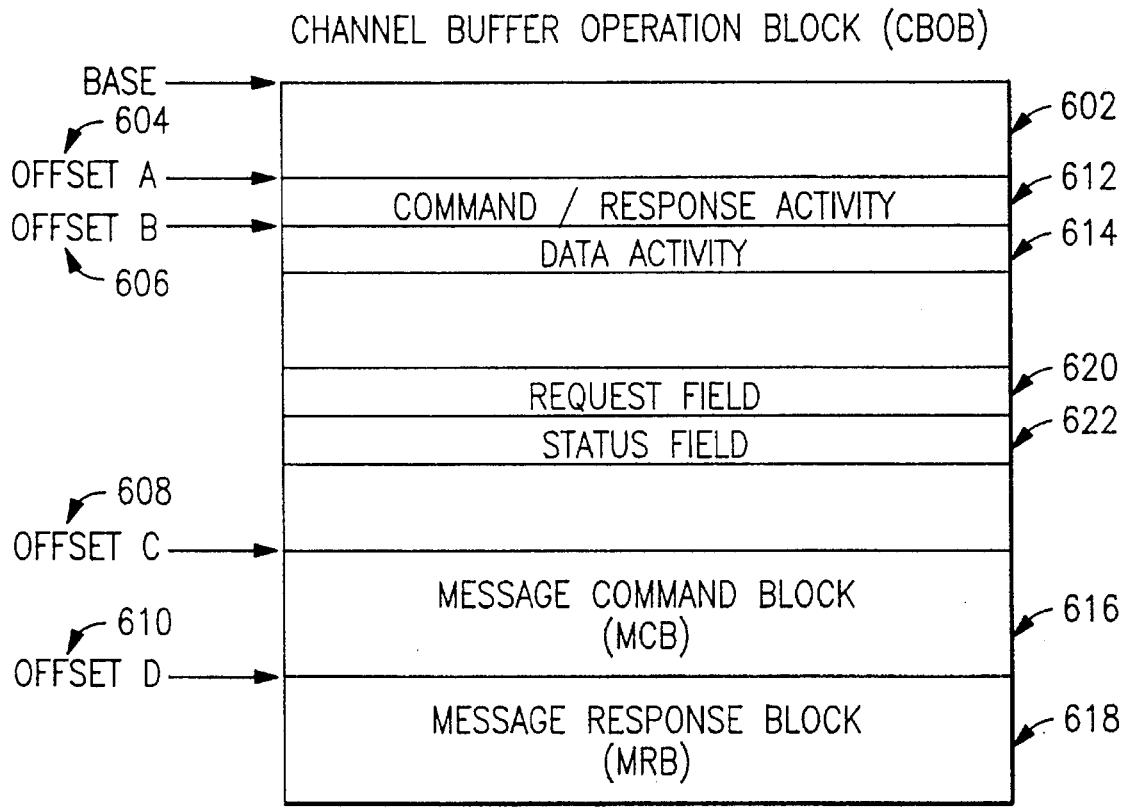
FIG. 6. describes the format of the channel buffer operation block (CBOB).

FIG. 6 shows the Channel Buffer Operation Block 602 (CBOB), and there is one CBOB located in main processor storage for each of the four buffer sets. Within each CBOB 602 there are four areas used to control the flow of information through the channel during normal operations. Each of these four areas is at a fixed offset from the base address of the CBOB 602. The Message Command Block (MCB) 616 and the Message Response Block (MRB) 618 are both stored in the CBOB 602 at fixed offsets C 608 and D 610, respectively, from the CBOB base address. The Command/Response Activity bit 612 is at offset A 604 and it indicates that there is either a valid MCB or MRB in the CBOB, depending on whether the CBOB is for an originator or recipient buffer set. The Data Activity bits 614 are at offset B 606, and they regulate the flow of data areas in both read and write operations.

When the channel is initialized, all four CBOB Address registers 504,506, 508, and 510 are set by the Coupling Facility Control Program (CFCP). The two Data Area Address registers 512 and 514 change as the CFCP sends and receives data areas. The base addresses of the CBOBs are chosen to be on relatively large storage boundaries allowing the low order bits of the addresses to have a value of zero. For example, if the address is on a 1024 byte boundary, the low order ten bits would be zero. With large storage boundaries, the storage addresses for the MCB, MRB, Command/Response Activity bit, and the Data Activity bits can be computed by logically ORing the offsets to the base address. No hardware adder function is required.

PREPARE CHANNEL BUFFER

Figure 7:
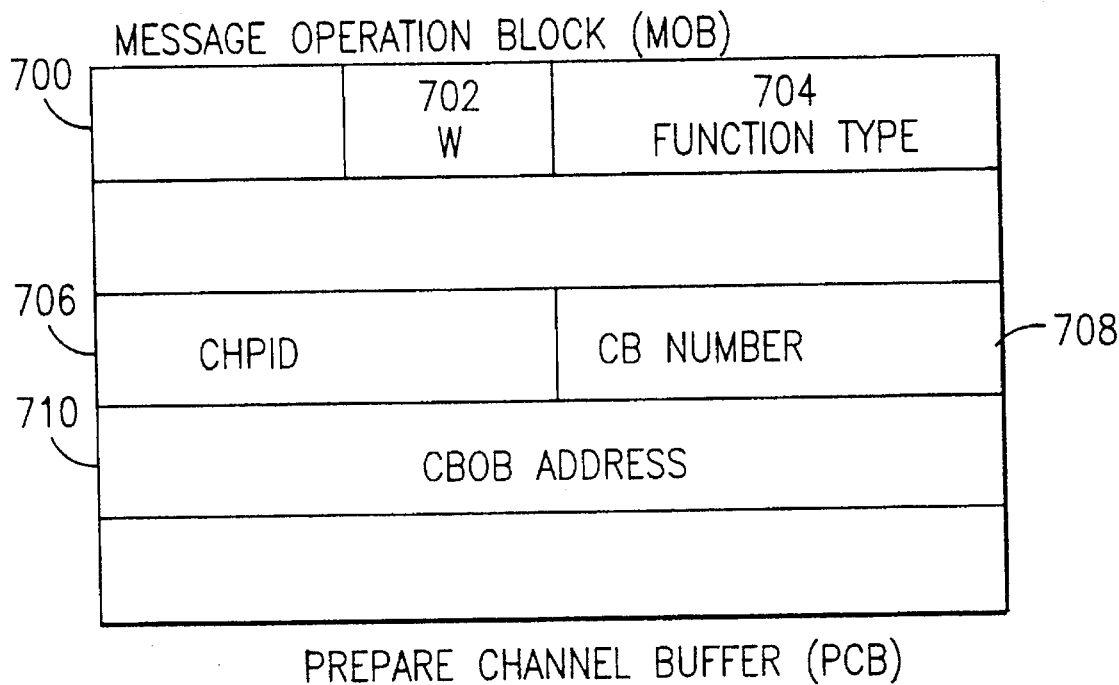
FIG. 7. describes the format of the message operation block for the PREPARE CHANNEL BUFFER instruction.

The Coupling Facility Control Program initializes the four CBOB addresses in the channel 504,506,508, and 510 by issuing a PREPARE CHANNEL BUFFER (PCB) instruction for each CBOB address register. Associated with the PCB instruction is a message operation block (MOB) which is depicted in FIG. 7. The MOB 700 contains a number of parameters: a valid bit W 702, a function type 704 which denotes the CBOB as either a primary channel buffer or a secondary channel buffer, the CHPID 706 which identifies the channel, the channel buffer (CB) number 708 which identifies the buffer 0 or buffer 1 within the channel, and the CBOB address 710 which is the value placed in the CBOB address register and points to a location in the memory 406. The combination of the function type and the channel buffer number identify the specific CBOB address register. A function type of primary associates the channel buffer with a recipient request area, and a function type of secondary associates the channel buffer with an originator response area. As an example, a PCB instruction with a function type of primary and channel buffer number of 0 will associate the channel buffer with recipient request area 0 520 and the CBOB address will be placed in the CBOB address area for recipient 0 508. In a similar fashion, a PCB with function type secondary and buffer number 0 will associate the channel buffer with originator response area 0 524 and initialize the originator 0 CBOB address register 504. Likewise a primary and secondary channel buffer are associated with recipient request area 1 522, and originator response area 1 526 with the corresponding CBOB addresses placed in 510 and 506 respectively.

When a PREPARE CHANNEL BUFFER is executed, the CBOB address register for the specified channel buffer is initialized and additionally control values are stored in the CBOB, the channel buffer is marked as assigned to the channel path for future status reporting by the channel system and a channel buffer token is returned to the CFCP. The channel buffer token is used by the CFCP when communication with the channel system is required. The token provides for fast lookup of controls associated with the hardware registers and buffers.

SIGNAL CHANNEL BUFFER

Figure 8:
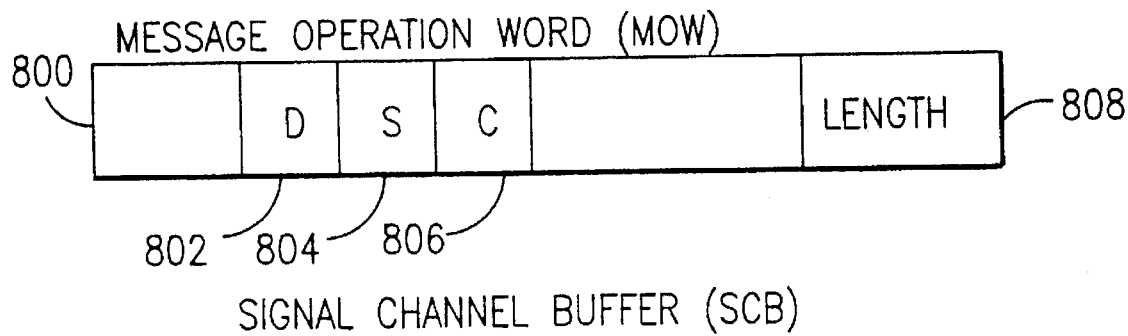
FIG. 8. describes the format of the message operation word for the SIGNAL CHANNEL BUFFER instruction.

The Coupling Facility Control Program sends the response to a primary command, sends a secondary command or receives the response to a secondary command by issuing a SIGNAL CHANNEL BUFFER (SCB) instruction for a specified channel buffer. Associated with the SCB instruction are two operands; the channel buffer token returned by PREPARE CHANNEL BUFFER and a message operation word (MOW) which is depicted in FIG. 8. The MOW 800 contains a number of parameters; a discard buffer (D) bit 802, a send block (S) bit 804, a command block (C) bit 806, and a length (L) value 808. The discard buffer bit 802 is set when a secondary command is issued and indicates to the channel that upon reception of the response, the response active indicator should be set, but the contents of the response should be deleted. This optimizes the processing for secondary commands where the response consists of a simple acknowledgement of completion. The send-block bit 804 is set when a primary response or a secondary command is sent. In combination with the setting of the command bit 806, the hardware is informed as to whether the block being set is a secondary command (S=1 and C=1) or is a primary response (S=1 and C=0). Likewise, a secondary response is received when the combination is S=0 and C=0. The combination S=0 and C=1 is not allowed; the function of receiving the command is performed by the channel without program control. The length value 808 tells the channel how many bytes of information to move. The location the data is moved from or to is at a fixed offset within the CBOB. For instance, when a primary MRB is sent, the channel fetches the contents of the memory location at offset D 618 from the CBOB address. Similarly, a secondary command is fetched from offset C 616, a secondary response is stored at offset D 618, and a primary command is stored at offset C 616. In each case the CBOB address that is used is the address stored in the CBOB address registered 504, 506, 508, or 510 that was prepared for the channel buffer.

MOVE CHANNEL BUFFER DATA

Figure 9:
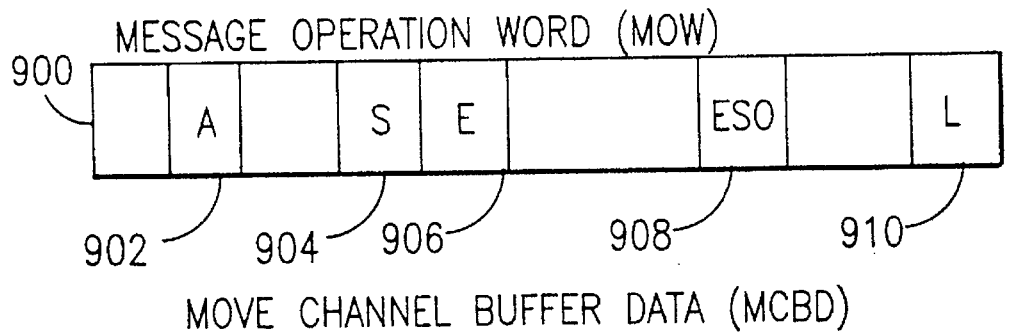
FIG. 9. describes the format of the message operation word for the MOVE CHANNEL BUFFER DATA instruction.

The Coupling Facility Control Program sends or receives data on a primary channel buffer by issuing a MOVE CHANNEL BUFFER DATA (MCBD) instruction for a specified primary channel buffer. Associated with the MCBD instruction are three operands; the channel buffer token returned by PREPARE CHANNEL BUFFER, the address of the data block in either main or expanded store, and a message operation word (MOW) which is depicted in FIG. 9. The MOW 900 contains a number of parameters; an associated data (A) bit 902, a send block (S) bit 904, an expanded store (E) bit 906, an expanded store offset (ESO) 908, and a length (L) value 910. The associated data bit 902 is set when another data block is to be sent or received after the current data block. When the data block is the only data block or the last data block to be sent or received, the A bit is zero. The send block bit 904 is set if the data is being sent from the coupling facility memory and is zero if the data is being received into the coupling facility memory. The E bit 906 indicates whether the data block address is a main store address or an expanded store address. When set, the address is an expanded store address and the ESO value 908 indicates the 256 byte offset within the specified expanded store block. The length value 910 specifies the number of bytes that are sent or received.

When executed the address of the data block in memory is placed in the recipient data area address register 512 or 514 and used by the channel during data transfer. In this way, the contents of the data area registers 512 and 514 are changed on each invocation of a data transfer operation.

TEST CHANNEL BUFFER

In certain conditions the channel system presents status in the channel buffer that is outside the normal execution of a command. In particular a retry cf a transfer operation may be requested by placing a retry request into the request field 620 of the CBOB. Also, when errors occur during a transfer operation one of several status conditions may be set in the status field 622 of the CBOB. When status is presented the channel buffer is made status pending.

Figure 10:
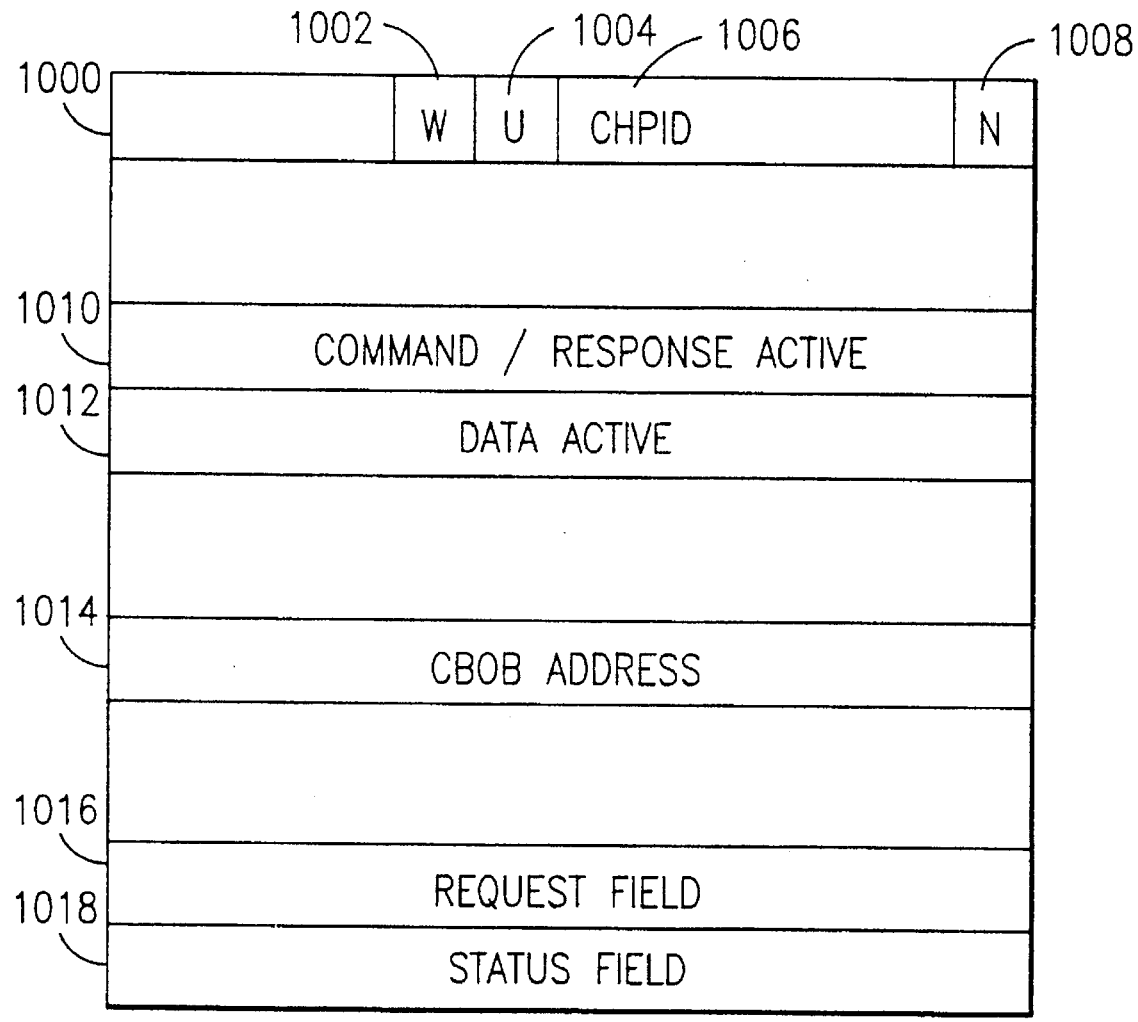
FIG. 10. describes the format of the channel buffer information bloc (CBIB).

The CFCP clears a request or status condition from the channel buffer by issuing a TEST CHANNEL BUFFER (TCB) instruction. In addition to clearing the conditions in the channel buffer, several fields are copied into the Channel Buffer Information Block (CBIB). The CBIB is depicted in FIG. 10 and includes several fields; the valid bit (W) 1002, the unprepared bit (U) 1004, the CHPID associated with the channel buffer 1006, the CB number 1008, the command/response active field 1010, the data active field 1012, the address of the CBOB 1014, the request field 1016, and the status field 1018.

Figure 11:
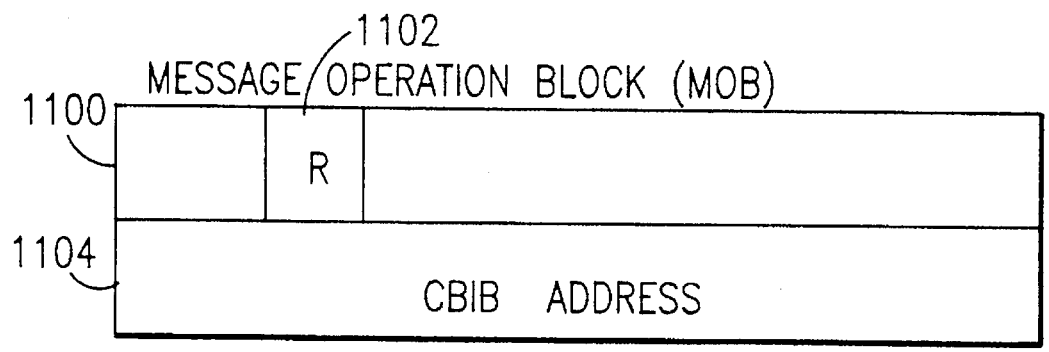
FIG. 11. describes the format of the message operation block for the TEST CHANNEL BUFFER instruction.

Associated with the TCB instruction are two operands; the channel buffer token returned by the PCB instruction and a message operation block (MOB) which is depicted in FIG. 11. The MOB 1100 contains two parameters; a receive function type (R) 1102 and a CBIB address 1104. The receive function type identifies whether the channel buffer selection is for the primary channel buffer or the secondary channel buffer.

LINK SEQUENCES FOR COMMAND, RESPONSE AND DATA TRANSFERS

Figure 12:
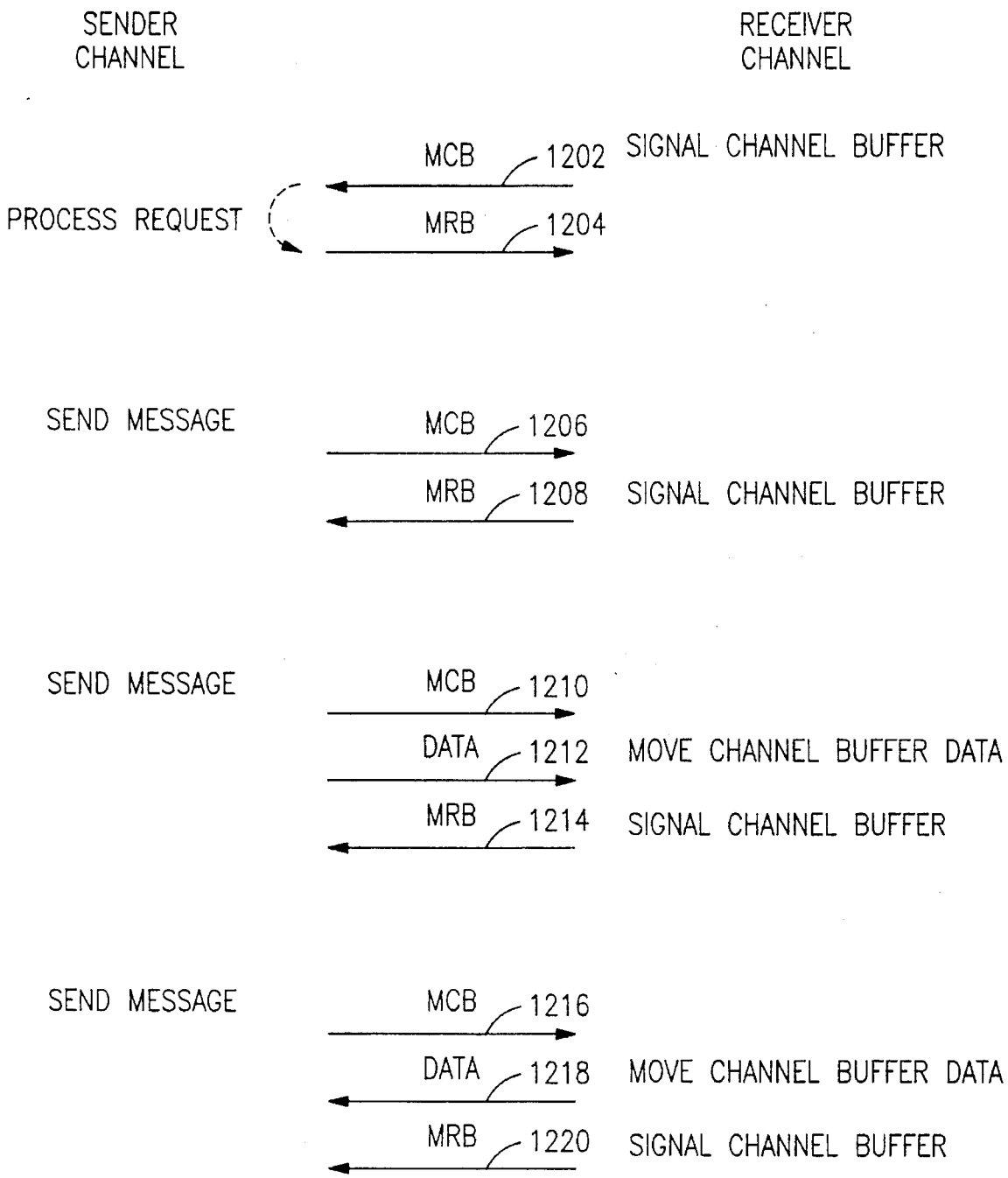
FIG. 12. illustrates sequences of command, data and response exchanges between the sender and receiver channels.

The simplest operational example is for an originator buffer set and is shown in FIG. 12. The CFCP sends a command by placing it in the CBOB MCB 616 and executing a SIGNAL CHANNEL BUFFER. This instruction tells the channel to send an MCB frame 1202 using the MCB in the CBOB. Recall that the CBOB address has previously been initialized. When the response is returned from the other end of the link in an MRB frame 1204, the channel stores the MRB in the CBOB and sets a bit in the Command/Response Activity 612 doubleword. Sometimes, the CFCP is only interested that the MRB has been returned, and the contents of the MRB are not important. To improve performance, when the CFCP does not want the channel to move the MRB to the CBOB, it sets the Discard bit when executing the SIGNAL CHANNEL BUFFER. This bit inhibits the channel from storing the MRB before it sets the Command/Response Activity bit.

The basic operation of the recipient buffer set is the same as the originator buffer set except that the MCB 1206 is received and CFCP responds by executing a SIGNAL CHANNEL BUFFER that sends the MRB frame 1208. More complicated operations requiring the movement of data areas show the other features of the channel. The first example involving data areas is a write operation to the CFCP where one data area is transferred. After the channel receives the MCB 1210, it moves it to the CBOB and sets the command-active-vector bit in the MBA. The CFCP detects the command-active-vector bit and starts to process the MCB. At the same time, a data area frame 1212 is most likely being received by the channel. After the CFCP has determined where the data area should be stored in main processor storage, it executes a MOVE CHANNEL BUFFER DATA which specifies an address. This address is sent down to the Data Area Address register 512 or 514, and the channel stores the data area. When the channel has completed storing the data, it sets one of the Data Activity bits 614 (Final) indicating that all of the data area has been successfully received and stored. The CFCP then puts an MRB in the CBOB and executes a SIGNAL CHANNEL BUFFER that causes the channel to send the MRB frame 1214.

The second example involving data areas is a read operation from the CFCP where one data area is transferred. After the channel receives the MCB frame 1216, it moves it to the CBOB and sets the command-active-vector bit. The CFCP detects the command-active-vector bit and starts to process the MCB. The CFCP then sends the data area by executing a MOVE CHANNEL BUFFER DATA which specifies an address. This address is sent down to the Data Area Address register 512 or 514, and the channel fetches the data area and sends the data frame 1218 on the link. When the channel has completed fetching the data, it sets one of the Data Activity bits 614 (Final) indicating that all of the data area has been successfully fetched. The CFCP then puts an MRB in the CBOB and executes a SIGNAL CHANNEL BUFFER that causes the channel to send the MRB frame 1220.

Figure 13:
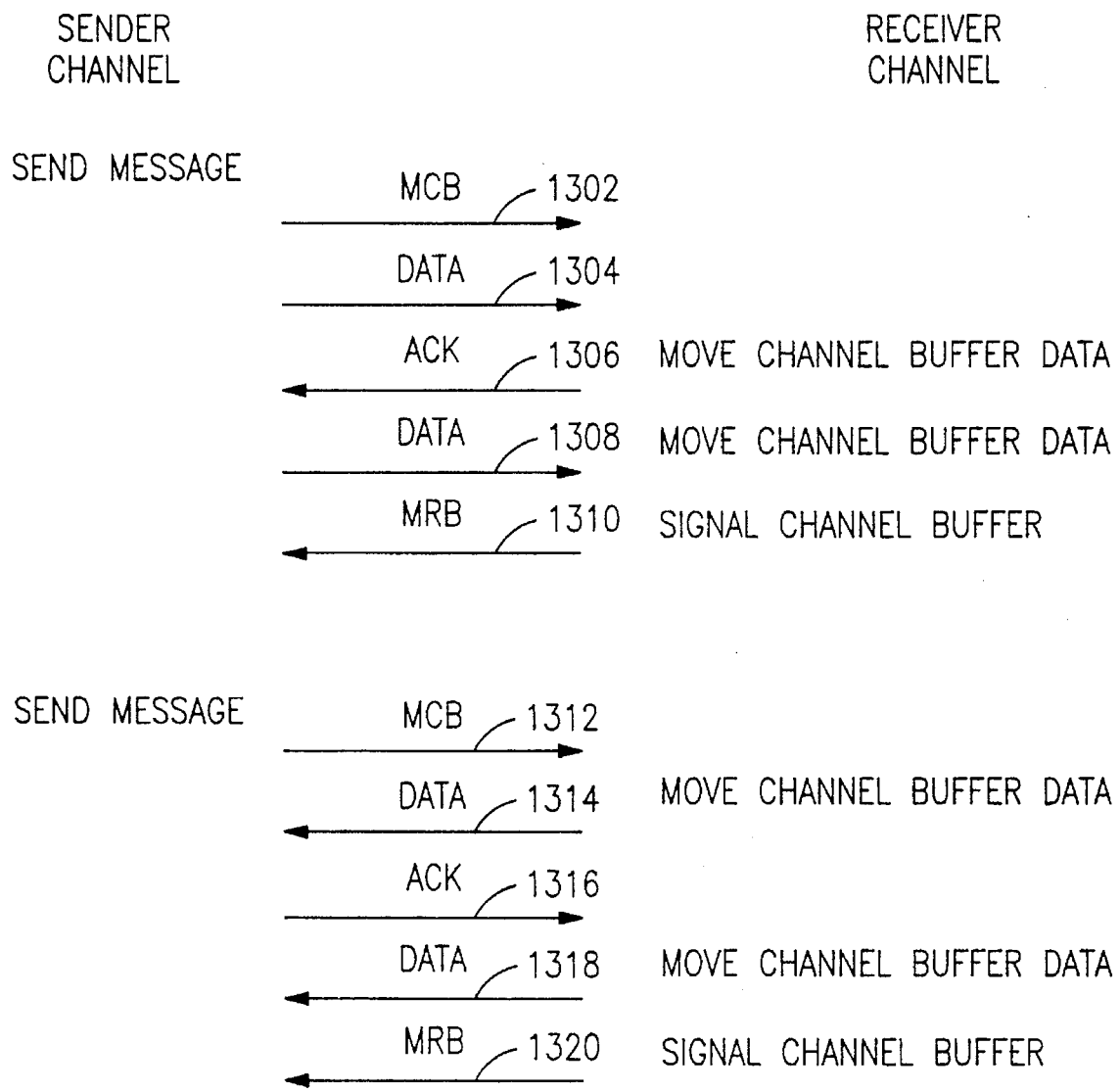
FIG. 13. illustrates additional sequences of command, data and response exchanges where multiple data transfers are performed.

The last two examples are moving multiple data areas, and these examples are shown in FIG. 13. In a multiple data area write operation, the channel receives the MCB 1302, moves it to the CBOB, and sets the command-active-vector bit. The CFCP detects the command-active-vector bit and starts to process the MCB. At the same time, the first data area frame 1304 is most likely being received by the channel. After the CFCP has determined where the data area should be stored in main processor storage, it executes a MOVE CHANNEL BUFFER DATA which specifies an address. This address is sent down to the Data Area Address register 512 or 514, and the channel stores the data area. When the channel has completed storing the data, it sends an Acknowledge (ACK) frame 1306 and waits for the next and last data area to be received. After the next data area frame 1308 is received, the channel sets one of the Data Activity bits 614 (Intermediate) indicating that all of the first data area has been successfully received and stored and that the next data area frame 1308 has arrived. The CFCP executes another MOVE CHANNEL BUFFER DATA that moves the data area frame 408 to main processor storage. When the channel has completed storing the data, it sets one of the Data Activity bits 614 (Final) indicating that all of the data area has been successfully received and stored. The CFCP then puts an MRB in the CBOB and executes a SIGNAL CHANNEL BUFFER that causes the channel to send the MRB frame 1310.

The last example involving multiple data areas is a read operation from the CFCP. After the channel receives the MCB frame 1312, it moves it to the CBOB and sets the command-active-vector bit. The CFCP detects the command-active-vector bit and starts to process the MCB. The CFCP then sends the first data area by executing a MOVE CHANNEL BUFFER DATA which specifies an address. This address is sent down to the Data Area Address register 512 or 514, and the channel fetches the data area and sends the data frame 1314 on the link. When the channel has completed fetching the data, it waits to receive an Acknowledge frame 1316. After this frame is received, the channel sets the Data Activity bit (Intermediate) indicating that the first data area frame 1314 was received by the Sender Channel. The CFCP detects this bit and executes another MOVE CHANNEL BUFFER DATA to send the second data area. After this data area frame 1318 has been fetched, the channel sets one of the Data Activity bits (Final) indicating that all of the data area has been successfully fetched. The CFCP then puts an MRB in the CBOB and executes a SIGNAL CHANNEL BUFFER that causes the channel to send the MRB frame 1320.

HARDWARE MECHANISMS AND LOGIC FOR LOCATE CHANNEL BUFFER

Figure 14:
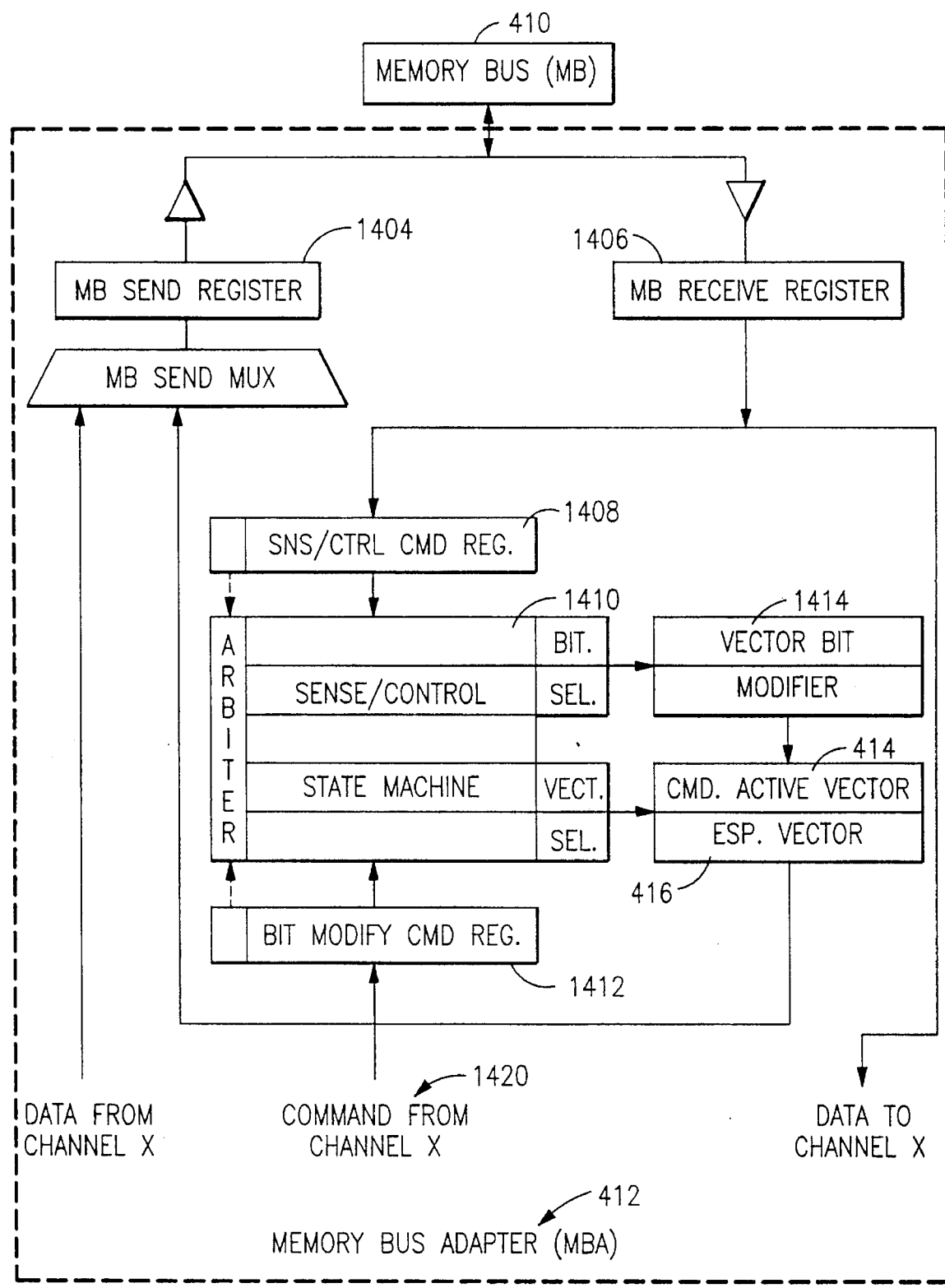
FIG. 14. is a block diagram of the memory bus adapter in the coupling facility.

The LOCATE CHANNEL BUFFER instruction is used by the work dispatcher function in the Coupling Facility Control Program as a means of efficiently detecting the arrival of a command in a primary channel buffer. FIG. 14 describes an essential hardware mechanism, the sense and reset operation for the command active vector and FIG. 15 describes the logic of the micro-code for the LCB instruction which uses the sense and reset operation at a key step.

More particularly, FIG. 14 is a block diagram that contains the hardware controls in the Memory Bus Adapter 412 or memory bus interface that are used for the sense and reset operation. The elements include a memory bus 410 which is the interface between the processor and the MBA, an MB send register 1404, and MB receive register 1406, a sense/control command register 1408, a sense/control state machine 1410 including an arbiter, a bit selector and a vector selector, a bit modifier command register 1412 which is the interface between the channel 1420 and the sense/control state machine 1410, a vector bit modifier 1414, and two vector registers; the command active vector 414 and the ESP vector 416. The processor microcode issues a sense and reset command on the memory bus 1402 interface. The sense and reset command includes a vector selection, command active vector 414 or ESP vector 416, a bit index within the vector, and a modification order to either set the bit or reset the bit. A corresponding sense command without a modification order is also available. The sense and reset (resp. sense only) command arrives at the MB receive register 1406, and is routed to the sense/control command register 1408. In the event that a bit modify command is active in the bit modify command register 1412 for a particular channel, the arbiter in the sense/control state machine 1410 delays the sense and reset (resp. sense) command for one clock cycle. Subsequent to the arbitration delay, the selected vector is placed in the MB send register 1404 and the modification order is performed by the vector bit modifier 1414 on the selected bit, with the last two operations occurring in the same clock cycle. The processor then receives the selected vector from the MB send register 1404 via the memory bus 410. The setting of the selected bit in the returned vector will be the same as prior to the execution of the modification order.

Figure 15A:
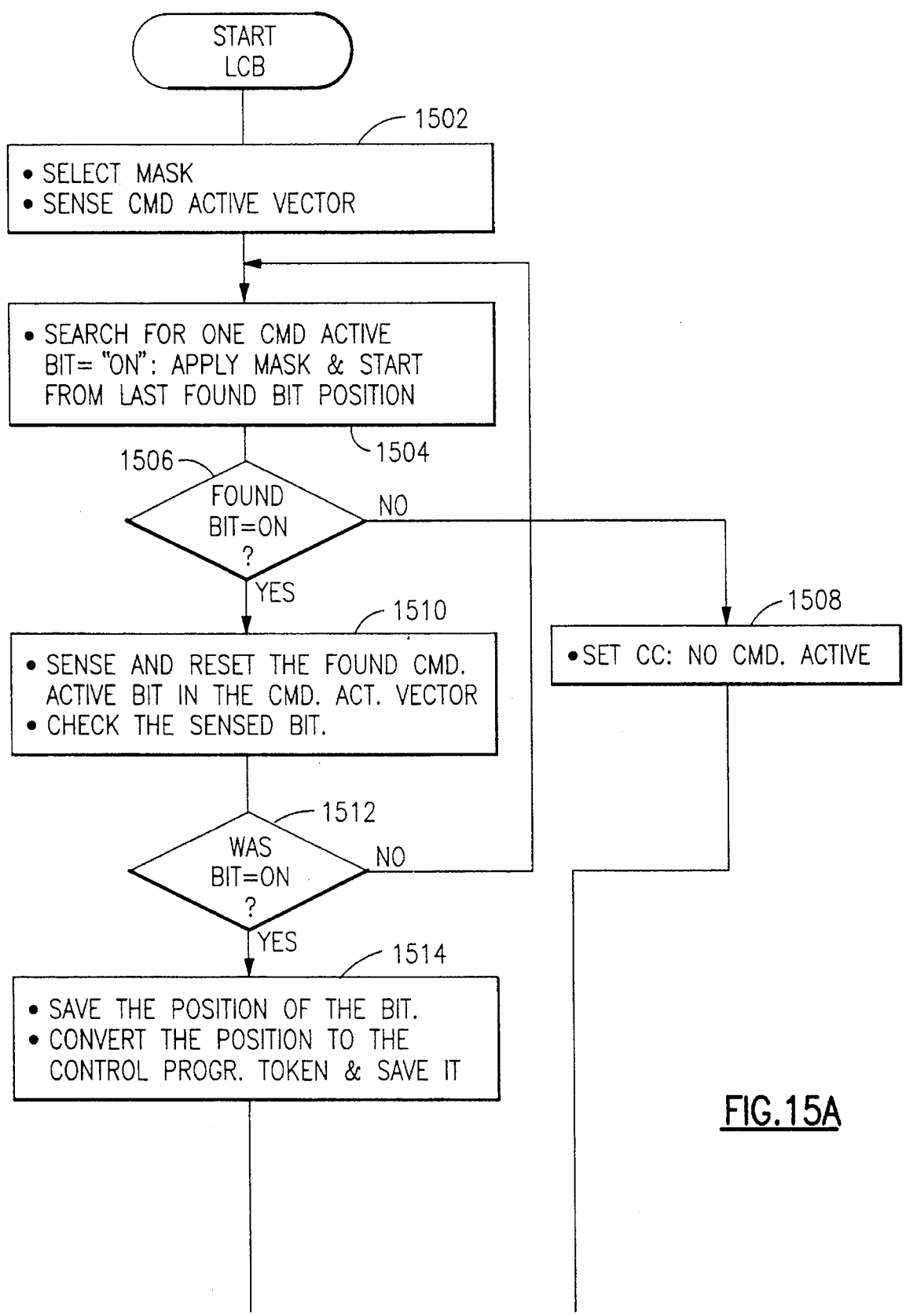
FIGS. 15, 15A and 15B describe the logic of the LOCATE CHANNEL BUFFER (LCB) instruction.
Figure 15B:
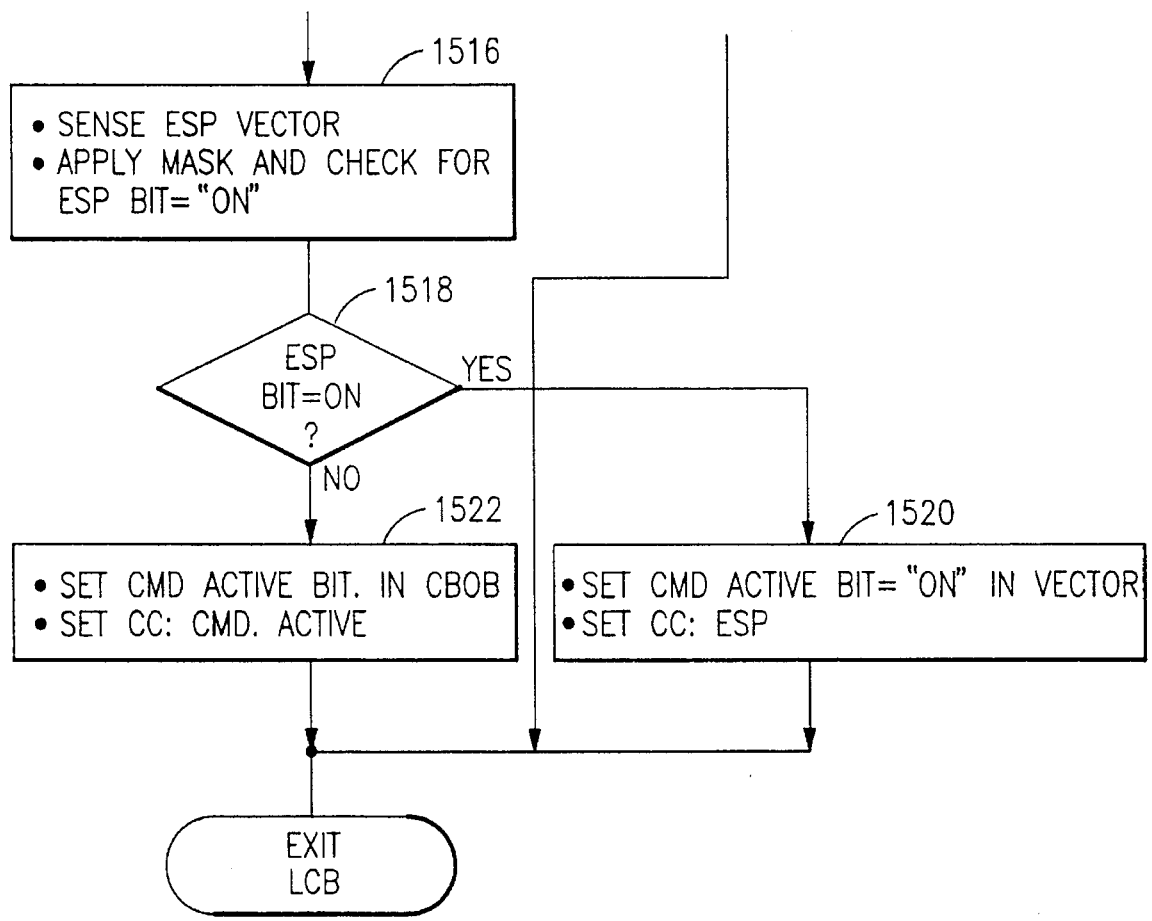
Figure 15:
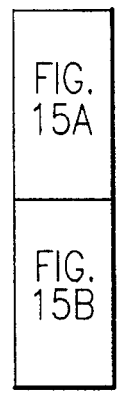

FIG. 15 describes the logic of the microcode program that executes the LCB instruction. Initially a sense command is sent to the MBA to fetch the command active vector and bits for channel buffers that are not available to the coupling facility are masked off 1502. The resulting vector is searched to find a bit that is set 1504. The search is directed by a round-robin algorithm. If no bit is found 1506, the instruction is completed with a condition code indication that no command is active 1508. In the event that a bit is found 1506, a sense and reset command is sent to the MBA with the selected bit in the command active vector identified in the command and a modifier order to reset the bit to zero 1510. The command active vector returned from the sense and reset command is checked to see if the bit was on when the sense and reset command was executed 1512. If the bit was not on, then another processor had isolated the command before this processor could do so. The logic now returns to 1504 to search for a different bit in the command active vector. If the bit was still on when the sense and reset command executed 1512 the command has been successfully isolated by this processor. Once isolated, the bit position is saved for the round robin section algorithm and the channel buffer token associated with the isolated command is saved for later return to the CFCP.

The logic of the LCB instruction now proceeds to the second pad of the instruction, namely to sense the presence or absence of link errors. This is accomplished by sending a sense command to the MBA to select and fetch the ESP vector 1516. Again the mask of available channel buffers is applied to mask off any bits corresponding to channel buffers that are not available to the coupling facility. The resulting vector is checked for any nonzero bits 1518. If any bit is set, a sense and reset command is sent to the MBA to modify the isolated bit in the command active vector to set the bit back on and upon completion, the instruction is completed with an ESP condition code 1520. If no bit is set in the masked ESP vector, the command active bit is set in the CBOB command request field, the channel buffer token is returned to the CFCP and the LCB instruction is completed with a command active condition code 1522.

MESSAGE DISPATCHING LOGIC WHEN LCB IS NOT UTILIZED

FIG. 16 depicts the logic of the message dispatcher within the Coupling Facility Control Program when LOCATE CHANNEL BUFFER is not used. The channel buffers are scanned under the control of a round robin algorithm 1602. Each channel buffer that is status pending is handled by calling a separate status pending routine that performs a TEST CHANNEL BUFFER 1604. Each channel buffer that has a retry request pending is handled by redriving the last message response block 1606. Otherwise, if a channel buffer is detected as command active (the command active field in a primary CBOB is set), then the second half of the LCB instruction is performed by determining if ally ESP indicators are set for channels with an active command.

The mechanism for testing the ESP state of a channel buffer is in this case, the TEST MESSAGE PATH STATE instruction 1610, which causes a sense command to be issued on the entire path 410, 412,418,420,422,424 and a returned response on the same path. This is a very long latency path in the hardware and must be issued once serially for intersystem channels with an active command in a channel buffer. In the more likely event that no errors are present, the command is isolated to the processor 1612 and execution of the command is initiated, 1614. Otherwise and error state exists and the error state is propagated to an internal software indicator, and the hardware indicator is reset with a CLEAR MESSAGE PATH STATE instruction 1610. The software indicator is also tested in the dispatch path before command execution is permitted 1608. The software indicator is reset in the future circumstance of the last active command completing execution.

If no channel buffers are command active, the dispatching routine completes with no message found 1616.

MESSAGE DISPATCHING LOGIC WHEN LCB IS UTILIZED

Figures 17, 17C:
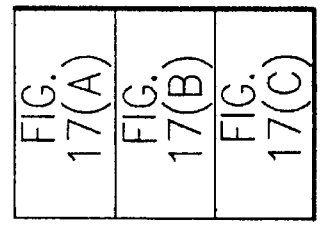

FIGS. 17 to 19 describe the preferred embodiment of the message dispatching algorithm in the CFCP by utilizing the present invention. Status pending and retry requests are handled first under the control of a round-robin algorithm 1702 and 1704. Secondly, the LCB instruction is issued 1706 which follows the logic outlined in FIG. 15 and utilizes the low latency paths between the processor and the MBA. LCB completion is followed by a decode of the condition code and the returned token 1802. If the condition code indicates that a nonzero control program token was returned then isolate the command to this processor 1804 and return 1806. Otherwise, if the token is zero do not isolate the command and return 1806.

In the event that no command is active the dispatching routine completes 1708. If the channel buffer is status pending, the status pending condition is cleared with a TEST CHANNEL BUFFER. If the channel buffer has an active command and the message path is active, the command is dispatched 1710 and 1712. If the channel buffer has an active command but the message path is inactive, the inactive path response is sent 1714. If the ESP condition code is returned by LCB, the ESP routine is called 1716. A TEST MESSAGE PATH STATE is issued for each intersystem channel and a CLEAR MESSAGE PATH STATE is issued for each intersystem channel in error. An additional software indicator is set when this occurs 1902.

An important advantage of the present embodiment over the previous is that the TMPS loop is only issued in the presence of a link error reported by LCB, whereas the prior ad required a TMPS loop in all command dispatch paths.

While we have described our preferred embodiments of our invention, it will be understood that those skilled in the ad, both now and in the future, may make various improvements and enhancements which fall within the scope of the claims which follow. These claims should be construed to maintain the proper protection for the invention first disclosed.

What is claimed is:

1. A computer system interface apparatus, comprising:
  a coupling facility comprising:
    a plurality of intersystem channels programmable to receive one or more commands from one or more central processing complexes coupled to said coupling facility;
    a memory for storing said one or more commands received by said plurality of intersystem channels;
    a memory bus adapter providing an interface between said plurality of intersystem channels and said memory, said memory bus adapter providing a central location for storing state information, said state information indicating whether any of said plurality of intersystem channels has an error and whether any of said one or more commands is stored in said memory; and
    at least one processor coupled to said memory bus adapter and said memory, said at least one processor programmable to poll said state information to determine when said one or more commands is stored in said memory and whether any errors exist, said at least one processor programmable to process said one or more commands when said one or more commands is stored in said memory and no errors exist on said plurality of intersystem channels.

2. A computer system interface apparatus according to claim 1 wherein said memory bus adapter comprises a first hardware vector to store error state vector indicators specifying whether any of said plurality of intersystem channels has an error, and a second hardware vector to store command active indicators specifying storage of said one or more commands in said memory.

3. A computer system interface apparatus according to claim 2, further comprising means for executing a LOCATE CHANNEL BUFFER (LCB) instruction to perform a sense and reset operation on said second hardware vector to identify and isolate a new command, and subsequently to read said first hardware vector to determine the presence or absence of said error(s).

4. A computer system interface apparatus according to claim 3 wherein when said error(s) are present, LCB restores one of said command active indicators and an error condition code is provided to a coupling facility control program executing within said coupling facility.

5. A computer system interface apparatus according to claim 3 wherein when none of said error(s) are present, LCB returns an identity of an isolated command to the coupling facility which can complete a dispatch operation.

6. A computer system interface apparatus according to claim 3, further comprising means for executing a coupling facility control program to identify and to isolate newly arrived commands and simultaneously detect an absence of said error(s).

7. A computer system interface apparatus according to claim 3 wherein a round-robin scan of the memory bus adapter is performed under a microprogram control for detecting command arrival to prevent biasing of service to particular intersystem channels.

8. A computer system interface apparatus according to claim 3 wherein a microcode program is provided for said memory bus adapter which executes the LCB instruction.

9. A computer system interface apparatus according to claim 3 wherein a microcode program is provided for said memory bus adapter which executes the LCB instruction, wherein initially a sense command is sent to said memory bus adapter to fetch said second hardware vector and wherein bits for channel buffers that are not available to the coupling facility are masked off, and a resulting vector is searched to find a bit that is set.

10. A computer system interface apparatus according to claim 2, wherein said coupling facility further comprises a memory bus providing an interface between said at least one processor and said memory bus adapter, and wherein said memory bus adapter further comprises a memory bus send register coupled to said memory bus, a memory bus receive register coupled to said memory bus, a sense/control command register coupled to said memory bus receive register, a sense/control state machine including an arbiter coupled to said sense/control command register, a bit modifier command register providing an interface between one of said plurality of intersystem channels and the sense/control state machine, and a vector bit modifier coupled to said sense/control state machine and said first and second hardware vectors.

11. A computer system interface apparatus according to claim 10, further comprising means for executing a processor program to issue a sense and reset command on said memory bus adapter, said sense and reset command including a vector selection of said first hardware vector or said second hardware vector, a bit index within said first hardware vector, and a modification order to either set a bit or reset the bit in said first or second hardware vector selected by said vector selection.

12. A computer system interface apparatus according to claim 2 wherein a dispatcher program is included with means for allowing for efficient lookup procedures by the dispatcher program by storing a token when a channel buffer is prepared and returning the token when a command arrival is reported.

13. A computer system interface apparatus according to claim 3 wherein said memory bus adapter is provided with access to said memory, said memory providing read-only areas and processor-specific fields for LCB functioning.

14. A computer system interface apparatus according to claim 1 wherein said one or more commands is transmitted between said plurality of intersystem channels and said at least one processor and when an error state pending indicia located in said memory bus adapter is on, one of said at least one processor must complete handling of the error before any other command will be processed by said at least one processor.

15. A computer system interface apparatus according to claim 1 wherein said one or more commands is transmitted between said plurality of intersystem channels and said at least one processor and when an error is indicated execution of any of said one or more commands is delayed.

16. A computer system interface apparatus according to claim 1 wherein said one or more commands is transmitted between said plurality of intersystem channels and said at least one processor and when an error is indicated execution of any of said one or more commands is delayed, and a logic flow will locate one of said plurality of intersystem channels with an active command, or set an indicator showing that said error is present.

17. A computer system interface apparatus according to claim 1 wherein said one or more commands is transmitted between said plurality of intersystem channels and said at least one processor and wherein state machine control logic controls an interface between one of said at least one processor and one of said plurality of intersystem channels, and selects a vector and conditionally sets or resets an indicator in said vector.

18. A computer system interface apparatus according to claim 1 wherein said one or more commands is transmitted between said plurality of intersystem channels and said at least one processor and wherein a locate channel buffer instruction is employed to provide an active command or set an indicator showing that there was no error in a link, in the event that an error had been indicated and was not present.

19. A computer system interface apparatus according to claim 1 wherein said one or more commands is transmitted between said plurality of intersystem channels and said at least one processor and wherein means are provided for isolating a command to one of said at least one processor, including a vector associated with every intersystem channel of said plurality of intersystem channels, a mask applied to a vector to show an intersystem channel assignment, where logical partitioning of a processor grouping is controlled by the mask.

\* \* \* \* \*

UNITED STATES PATENT AND TRADEMARK OFFICE
CERTIFICATE OF CORRECTION

PATENT NO. : 5,574,945

DATED : November 12, 1996

INVENTOR(S) : Elko et al.

It is certified that error appears in the above-identified patent and that said Letters Patent is hereby corrected as shown below:

Col. 2, line 57        after "Elko," insert --et al, Serial Number 08/147,697, filed November 4, 1993;--

Signed and Sealed this

Fifteenth Day of April, 1997

Attest:

BRUCE LEHMAN

Attesting Officer      Commissioner of Patents and Trademarks